United States Patent
Murray

[11] Patent Number: 5,723,534
[45] Date of Patent: Mar. 3, 1998

[54] TWO PART POLYURETHANE-BASED ADHESIVE SYSTEM

[75] Inventor: Pat L. Murray, Spring, Tex.

[73] Assignee: Polyfoam Products, Inc., Spring, Tex.

[21] Appl. No.: 729,599

[22] Filed: Oct. 11, 1996

[51] Int. Cl.$^6$ .................. C08J 3/00; C08K 3/20; C08L 75/00; C08F 8/30

[52] U.S. Cl. ............ 524/590; 524/591; 524/507; 524/839; 524/840; 525/123; 525/455; 528/44; 528/65; 528/66; 528/76; 528/77; 528/85

[58] Field of Search .................. 524/590, 591, 524/839, 840, 507; 528/44, 65, 66, 76, 77, 85; 525/123, 455

[56] References Cited

U.S. PATENT DOCUMENTS

| | | | |
|---|---|---|---|
| 3,719,050 | 3/1973 | Asao et al. | 61/36 R |
| 3,931,077 | 1/1976 | Uchigaki et al. | 260/26 |
| 4,118,354 | 10/1978 | Harada et al. | 260/29.2 TN |
| 4,181,557 | 1/1980 | Doggett et al. | 156/331 |
| 4,241,537 | 12/1980 | Wood | 47/77 |
| 4,372,799 | 2/1983 | Rasmussen | 156/285 |
| 4,539,345 | 9/1985 | Hansen | 523/219 |
| 4,574,793 | 3/1986 | Lee et al. | 128/90 |
| 4,891,269 | 1/1990 | Markevka et al. | 428/423 |
| 4,913,969 | 4/1990 | Schulte et al. | 428/420 |
| 4,984,949 | 1/1991 | Reckziegel | 412/8 |
| 5,061,555 | 10/1991 | Edenbaum et al. | 428/253 |

FOREIGN PATENT DOCUMENTS 0331215  9/1989  European Pat. Off.

*Primary Examiner*—Patrick D. Niland
*Attorney, Agent, or Firm*—Pravel, Hewitt, Kimball & Krieger

[57] ABSTRACT

A two part polyurethane adhesive system and method of using the adhesive to bond polyurethane foams, polystyrene foams, and other substrates. The first part of the adhesive system is a hydrophilic polyurethane prepolymer prepared by reacting a high molecular weight, multi-functional polyol which has been copolymerized randomly from propylene oxide and ethylene oxide, with a diisocyanate or polyisocyanate. This reaction mixture is then diluted with either a flame retardant, a plasticizer, a solvent which is not considered a volatile organic compound, or a combination of these chemicals. The second part of the adhesive system is an aqueous phase curing agent. In addition to water, the components of the aqueous phase may include a tackifying agent or a catalyst or both. The method of bonding using the adhesive essentially comprises applying the polyurethane prepolymer to one of the substrates which is to be bonded, applying the aqueous phase curing agent to the polyurethane prepolymer, and placing the second substrate in contact with the prepolymer. The prepolymer and the aqueous phase curing agent may be applied sequentially or simultaneously.

35 Claims, No Drawings

TWO PART POLYURETHANE-BASED ADHESIVE SYSTEM

SPECIFICATION

1. Field of the Invention

This invention relates to an adhesive and a method of bonding with the adhesive. More specifically, the invention relates to a two part polyurethane-based adhesive and a method of bonding polyurethane foams, polystyrene foams, and other substrates with the adhesive.

2. Background of the Invention

Chlorinated solvent-based adhesives have historically been used for bonding together pieces of cellular polyurethane foam and for bonding cellular polyurethane foam to other materials such as fabrics, fibers, or corrugated paper. These solvent-based adhesives were preferred in many polyurethane fabricating applications because of the soft durable bonds they created, the high flash points of the adhesive chemicals, the quick drying properties, and the ease of use associated with these adhesives. Typically, these adhesives comprised a solution of a high molecular weight polymer such as nitrile rubber, butadiene, or natural rubber and a chlorinated solvent such as 1,1,1-trichlorethane or methylene chloride. The solvents in these solvent-based adhesives often constituted as much as seventy-five percent of the weight of adhesive. Much of this chlorinated solvent was evaporated into the atmosphere during the process of using the adhesive.

As increasingly stringent environmental regulations and legislation, such as the Clean Air Act, began to be implemented in the early 1990's, polyurethane foam fabricators were required to find replacements for these chlorinated solvent-based adhesives. The chlorinated solvents used in these adhesives became recognized as hazardous air pollutants and toxic substances. Alternative solvents such as mineral spirits, naptha, alcohol, acetone, and ketone were used as substitutes for the chlorinated solvents, however, these substitutes typically had low flash points and high levels of volatile organic compounds (VOC).

Water-based emulsion adhesives have also been used as alternatives to the chlorinated solvent adhesives. These water-based emulsion adhesives were similar to the solvent-based adhesives in that a polymer was solubilized or dispersed in water. However, unlike the solvent-based adhesives, the water-based adhesives did not necessarily require the water to evaporate in order for the polymer to function as an adhesive. Instead, the polymer contained in the water-based emulsions could also be released from the water by numerous methods including shearing forces, pressure, changes in pH, or by chemical additives.

These water-based emulsion adhesives had several disadvantages when compared to the chlorinated solvent-based adhesives. Particularly, the amount of time required for a final cure was much longer and the instability associated with the water-based emulsions resulted in line and equipment plugging problems. Additionally, the shelf life of the water-based emulsion adhesives was dependant upon the storage temperature and could be very limited in either hot or cold storage conditions. Many of these type of adhesives would become unstable when exposed to certain metals such as iron, brass, or aluminum. This often meant that special equipment was required to use the water-based emulsion adhesives. Additionally, ammonia would sometimes be added to these adhesives to decrease the instability, but this addition of ammonia would result in a noxious odor upon use of the adhesive.

Thermosetting moisture-cure polyurethane adhesives have been used in the adhesive art outside of the cellular foam fabrication industry, however, polyurethane adhesives were generally known for forming very weak initial bonds. U.S. Pat. Nos. 4,539,345 and 4,891,269 disclosed various attempts to overcome this weakness in initial bond strength, but these attempts required blending a polyurethane prepolymer with other components such as thermoplastic polymers and aromatic or aliphatic-aromatic tackifying resins.

In addition to use in polyurethane adhesives, polyurethane prepolymers have been manufactured for use in many other applications. Polyurethane prepolymers are reaction mixtures of polyols and isocyanates in which one of these components is in stoichiometric excess. The prepolymer resulting from the reaction of these components remains a liquid and retains reactive functional groups of the excess component. Traditionally, polyurethane prepolymers have been manufactured because they reduce the vapor hazard associated with the isocyanate component and because the increased viscosity of the prepolymer enhances processing capabilities as compared to the unreacted components. Polyurethane prepolymers have also been used to form hydrogels used in soil stabilization and waste treatment. These hydrogels are formed when the polyurethane prepolymers are brought into contact with a relatively large amount of water. Examples of polyurethane prepolymers used to form hydrogels are disclosed in U.S. Pat. Nos. 4,241,537, 4,118,354, and 3,719,050.

It would be desirable for an adhesive system to be flexible and to be capable of easily adjusting tack and cure properties depending upon the needs of a particular application. Additionally, it would be desirable if the adhesive system was environmentally safe, did not contain chlorinated solvents or other volatile organic compounds, and did not have the equipment plugging or other problems associated with water-based emulsion adhesives.

SUMMARY OF THE INVENTION

The present invention provides a two part polyurethane adhesive system and a method of bonding using the adhesive system. The adhesive system of the present invention is chemically storage stable and has acceptable cure properties, but does not require chlorinated solvents or other volatile organic compounds. Additionally, the two part nature of the adhesive enhances the flexibility of the adhesive system allowing for manipulation of curing, open, and set times.

The first part of the adhesive system of the present invention is a hydrophilic polyurethane prepolymer prepared by reacting a high molecular weight, multi-functional polyol which has been copolymerized randomly from propylene oxide and ethylene oxide, with a diisocyanate or polyisocyanate. This reaction mixture is then diluted with either a flame retardant, a plasticizer, a solvent which is a not considered a volatile organic compound, or a combination of these chemicals as may be required for the end use application. In the prepolymer, the functional groups of the isocyanate, the "NCO" groups, are in excess such that the functional groups of the polyol, the hydroxyl groups, are capped and create cross linking within the prepolymer while a number of NCO groups remain available for further reaction.

The second part of the adhesive system is an aqueous phase curing agent. In addition to water, the components of the aqueous phase may include a tackifying agent or a catalyst or both. The actual composition of the aqueous phase curing agent can be varied to adjust for the amount of tack and the cure time desired in a given application.

The method of adhering using the adhesive of the present invention essentially comprises applying the polyurethane prepolymer to one of the substrates which is to be bonded, applying the aqueous phase curing agent to the polyurethane prepolymer, and placing the second substrate in contact with the prepolymer. The prepolymer and the aqueous phase curing agent may be applied sequentially or simultaneously.

DETAILED DESCRIPTION OF PREFERRED EMBODIMENT

The adhesive system of the present invention is a two part adhesive including a first part which is a polyurethane prepolymer and a second part which is an aqueous phase curing agent. The two part nature of the adhesive provides for chemical stability prior to combination of the two parts, flexibility in the open and set time of the adhesive, and also eliminates the need for chlorinated solvents or volatile organic compounds.

The first part of the adhesive system of the present invention is the hydrophilic polyurethane prepolymer. The prepolymer is prepared by reacting a high molecular weight, multi-functional polyol with a diisocyanate or polyisocyanate. The initial prepolymer resulting from this reaction may be diluted with a flame retardant, a plasticizer, a solvent which is a not considered a volatile organic compound, or a combination of these chemicals.

The prepolymer used in making the adhesive system of the present invention has a relatively high molecular weight with a relatively low amount of excess NCO per unit weight. This formulation yields more hydrophilic polymer between the terminal NCO groups, which are by themselves hydrophobic. As a result, the overall prepolymer is hydrophilic and water soluble.

To obtain the high molecular weight prepolymer, a high molecular weight polyol is required as a reactant. Such a polyol is manufactured by starting with an initiator, and polymerizing with alkylene oxides to obtain a functionality of at least two and a number average molecular weight in the range of about 1000 to about 5000 per terminal hydroxyl group.

Preferably, the polyol should be polymerized randomly with ethylene oxide and propylene oxide with between about 50 and about 90 percent of the polyol by weight being ethylene oxide. A polyol polymerized using exclusively ethylene oxide would be hydrophilic and water soluble, but could also be a solid at ambient temperatures. Using more than about 50% by weight of propylene oxide in the polymerization of the polyol does not result in the necessary hydrophilic properties desired. Most preferably, between about 65 and about 75 percent by weight of the polyol results from ethylene oxide polymerization and the average molecular weight of the polyol is between about 1500 to about 2000 per terminal hydroxyl group. The preferred commercially available polyols for use in the polyurethane prepolymer of the present invention are Multranol E9199 made by Bayer Corporation or Voranol CP1421 made by Dow Chemical Company or equivalent.

Suitable isocyanates for use in the prepolymer should have at least two isocyanate groups per molecule. Various isomers of toluene diisocyanate (TDI), isomers of diphenylmethane diisocyanate (MDI), and blends of these isomers and isocyanates may be used to manufacture the polyurethane prepolymer portion of the present invention, however, a polymeric MDI is the preferred isocyanate for use in manufacturing the prepolymer. The preferred commercially available polymeric MDI products for use in the polyurethane prepolymer are Mondur 582 made by Bayer Corporation or PAPI 94 made by Dow Chemical Company.

Also suitable are aliphatic polyisocyanates such as the triisocyanate, Desmodur N-100, which is a biuret adduct of hexamethylenediisocyanate and Desmodur W which is 4,4'-dicyclohexylmethane diisocyanate sold by Bayer; IPDI or isophorone diisocyanate which is 3-isocyanatomethyl-3,5,5-trimethylcyclohexyl isocyanate; or THMDI which is a mixture of 2,2,4- and 2,4,4-isomers of trimethyl hexamethylene diisocyanate. These materials are used in formulating UV stable polymers.

The isocyanate is reacted with the polyol to produce a prepolymer having a free NCO content of between about 1% and about 20% by weight. Preferably, the prepolymer has about 5 to about 15 percent free NCO by weight. Most preferably, about 8 to about 12 percent free NCO by weight is used. The cross link characteristic of the prepolymer may be adjusted according to the application demands through the selection of an appropriate isocyanate functionality or polyol functionality.

The prepolymer forming reaction is carried out at a temperature in the range of about 20° to about 100° C., preferably between about 30° and about 65° C. Although the reaction is operable under atmospheric conditions, it is preferably carried out in an inert, moisture free medium such as under a nitrogen blanket.

Reaction of the isocyanate and polyol will produce a liquid prepolymer for use in the present invention having a viscosity of between about 2,000 and about 25,000 centipoise at 25° C. Use of TDI isocyanates results in a prepolymer at the lower end of the viscosity range while use of MDI isocyanates results in a higher viscosity prepolymer.

To prepare the initial prepolymer for use in the adhesive system of the present invention the solids level of the prepolymer can be adjusted using liquid flame retardants, plasticizers, or solvents which are not considered volatile organic compounds. The initial prepolymer should be diluted to reduce the viscosity to between about 1000 and about 1500 centipoise at 25° C. Typically, the initial prepolymer requires dilution with about 30 to 60 percent by weight with these components. When TDI is used, the prepolymer will require as little as 10 percent by weight dilution may be required.

Because low density, open-celled polyurethane foams have a large surface area and a high permeability to air, these foams burn given a sufficient ignition source and oxygen. This is a particularly important issue for foams used in furniture and bedding. For this reason flame retardants are often added to the polyurethane chemicals used to make these foams. When the adhesive system of the present invention is used in these types of applications, the cured adhesive should be able to meet the same flammability testing requirements as the foam. Generally, this requires the use of a flame retardant.

Flame retardants are generally, but not limited, to phosphorous and/or halogen based retardants. Acceptable flame retardants for use in the prepolymer of the present invention include isocyanate compatible Fyrol PCF made by AKZO Chemicals or equivalents. The amount of flame retardant used is dependant upon the type actually used, however, in any case, it should be an amount which allows the cured adhesive to meet the flammability requirements of the application for which it is intended.

In addition to flame retardants, isocyanate compatible plasticizers may also be added to the prepolymer of the present invention. Plasticizers are nonreactive liquids which can be used to soften the cured adhesive and also to reduce the viscosity of the prepolymer for processing purposes. The amount of plasticizers which can be added is limited by the adverse physical effects, such as increased density, that may result from their use. A particularly suitable plasticizer which can be used in the prepolymer of the present invention is dimethylphthalate.

A solvent may be required to control the viscosity of the prepolymer in addition to or in place of the flame retardants and the plasticizers. The solvents used to dilute the prepolymer of the present invention should be isocyanate compatible and non-volatile organic compounds. Isocyanate compatible solvent particularly suited for the present invention is DE Acetate (Diethylene Glycol Monobutyl Ether Acetate) as made by Eastman Chemicals and/or DBE (Aliphatic Dibasic Acid Esters) made by Dupont. The amount of solvent required to properly dilute the prepolymer is variable depending upon the viscosity of the initial prepolymer and the type and amount of flame retardants and plasticizers used.

The second part of the adhesive system of the present invention is an aqueous phase curing agent. As used herein, the terms "aqueous phase curing agent" mean water alone or water with other chemical additives. The required composition of the aqueous phase curing agent is dependant upon the parameters desired in the adhering process.

Water alone is an effective curing agent for the polyurethane prepolymer of the present invention. Water is an active source of hydrogen and the NCO groups of the isocyanate prepolymer react with the water. If water alone is used as the aqueous phase curing agent, the adhesive system as applied has low initial tack and may require the substrates to be held together for several minutes to complete the bonding process.

A catalyst may be added to the water for applications in which faster set and cure times are desired. Aqueous phase curing agents composed of water and catalyst result in an adhesive system which develops tack sooner and cures faster than when water alone is used as a curing agent. Suitable catalysts for use in the aqueous phase curing agent of the current invention include water stable organometallic compounds such as tin mercaptides like UL-1, UL-22, and UL-32 made by Witco, and potassium octoate, amines such as triethylene diamine, dimethyl piperazine, bis[2-(N,N,-dialkylamino)alkyl] ethers, and dimorpholino dialkyl ethers, and other urethane-forming catalysts known to those skilled in the art.

The concentration of the catalyst used in the aqueous phase is dependant upon the catalyst used. The preferred concentration of amine catalyst is generally between about 2 and about 20 percent by weight of the aqueous phase curing agent. More preferably, the concentration of amine catalyst in the aqueous phase curing agent is between about 8 and about 12 percent.

If the application in which the adhesive system of the present invention is to be used requires an initial tack, a tackifying agent can be added to the aqueous phase curing agent. A tackifying agent may be used in conjunction with a catalyst or without a catalyst. When a tackifying agent is used in the aqueous phase curing agent, the water portion of the aqueous phase is readily attracted to the hydrophilic nature of the prepolymer and this instant attraction combines with the tackifying agent to improve the initial bonding strength of the adhesive system.

Tackifying agents which may be used in the aqueous phase curing agent of the present invention include polyvinyl alcohol, vinyl alcohol emulsions, and SBR latex and other polymeric emulsions. Commercially available products which are suitable tackifying agents include Flexbond 165 Emulsion (vinyl acetate and acrylic polymer), Airvol 540 (polyvinyl alcohol), Airvol 203 (polyvinyl alcohol) made by Air Products, SBR latex made by Goodyear, and natural rubber latex.

The method of adhering using the adhesive of the present invention essentially comprises applying the polyurethane prepolymer to one of the substrates which is to be bonded, applying the aqueous phase curing agent to the polyurethane prepolymer, and placing the second substrate in contact with the prepolymer. The prepolymer or the aqueous phase curing agent can be applied by utilizing a spraying system, by brushing on, by rolling on, or by other means of evenly distributing these adhesive parts over the surface of a substrate.

The prepolymer and the aqueous phase curing agent may be applied sequentially or simultaneously. When the prepolymer and the curing agent are applied simultaneously, a stream of prepolymer and a stream of curing agent is sprayed onto the surface of the substrate to be bonded such that the aqueous phase is applied to the prepolymer in an evenly dispersed manner. For applications which require extended working time, the prepolymer can be applied to the bonding surface and be later followed with an application of the aqueous phase curing agent. Additionally, the prepolymer can be applied and the aqueous phase curing agent applied in small sections as desired to allow positioning of the substrates.

Generally, the weight ratio of prepolymer to aqueous phase curing agent used in the adhesive system of the present invention should be between about 0.1 to 1 and about 1.0 to 1.0. Preferably, the weight ratio should be about 1 to 1.

The present invention is further illustrated, but is expressly not limited, by the following examples.

EXAMPLE 1

Preparation of the Prepolymer

Three hundred twenty-five grams of a polyether triol, Multranol E9199, made by Bayer Corporation was reacted at about 65° C. for 2 hours with 175 grams of a PMDI, Mondur 582, made by Bayer Corporation. The prepolymer reaction produced a clear amber liquid with a viscosity of 15,000–20,000 cps at 25° C. The prepolymer viscosity was reduced using 27 grams of a liquid isocyanate compatible flame retardant, Fyrol PCF made by AKZO Chemicals, 18 grams of an isocyanate compatible solvent, DE Acetate made by Eastman Chemicals, and 9 grams of an isocyanate compatible plasticizer, dimethylphthalate. The prepolymer viscosity after dilution was 1000 to 1500 cps range at 25° C.

EXAMPLE 2

Using the polyurethane prepolymer as prepared in Example 1, a thin layer of the prepolymer was applied to a surface of a flexible foam substrate. An aqueous phase, consisting of water, was sprayed onto the layer of prepolymer on the substrate surface. The treated substrate surface was held together with a second flexible foam substrate surface for three minutes and an adhesive bond was established. Thereafter, attempts to separate the two substrates resulted in tearing of the foam substrates, with no failure of the adhesive bond.

EXAMPLE 3

Using the polyurethane prepolymer as prepared in Example 1, a thin layer of the prepolymer was applied to a surface of a flexible foam substrate. An aqueous phase, consisting of water with 6% by weight amine catalyst, was sprayed onto the layer of prepolymer on the substrate surface. The adhesive system on the foam substrate exhibited initial tack in 25 to 30 seconds with 45 to 50 seconds of open work time. Open work time is the allowable time to reposition the items for bonding. The treated substrate surface was held together with a second flexible foam substrate surface and an adhesive bond was established. After sixty seconds, attempts to separate the two substrates, resulted in tearing of the foam substrates with no failure of the adhesive bond.

EXAMPLE 4

Using the polyurethane prepolymer as prepared in Example 1, a thin layer of the prepolymer was applied to a surface of a flexible foam substrate. An aqueous phase, consisting of water with 12% by weight amine catalyst, was sprayed onto the layer of prepolymer on the substrate surface. The adhesive system on the foam substrate exhibited an initial tack in 15 to 23 seconds with 35 to 45 seconds of open work time. The treated substrate surface was held together with a second flexible foam substrate surface and an adhesive bond was established. After sixty seconds, attempts to separate the two substrates resulted in tearing of the foam substrates, with no failure of the adhesive bond.

EXAMPLE 5

Using the polyurethane prepolymer as prepared in Example 1, a thin layer of the prepolymer was applied to a surface of a flexible foam substrate. An aqueous phase, consisting of an SBR latex emulsion made by The Goodyear Tire and Rubber Company which was reduced by 10% for processing, was sprayed onto the layer of prepolymer on the substrate surface. Surface tack was immediate, allowing for 2 minutes open time and 2 minutes and 30 seconds of cure time. Attempts to separate the substrates resulted in tearing of the foam substrates, with no failure of the adhesive bond.

As shown by the disclosure and the above examples the adhesive system of the present invention provides chemically stable adhesive system but does not require chlorinated solvents or other volatile organic compounds (VOC's). Additionally, the two part application technique allows for the simple manipulation of tack, open, set, and curing properties. The adhesive system may be used to bond together a variety of substrates including flexible foams, foam backed vinyls, cloth to flexible foam, carpet to fiberglass, paper, polystyrene, etc. The adhesive system of the present invention is particularly suited for use in the cellular polyurethane foam fabrication industry to bond flexible foams, the packaging industry to bond polyurethane and polystyrene parts, and for use in automotive and boating industries to bond cloth, carpeting, and headliners to various substrates.

The adhesive system of the present invention may also be used to provide a polyurethane or urea modified polyurethane coating or sealant on a variety of surfaces including flexible foam, rigid foam, fabrics, masonry walls, or floors. When the present invention is used as a coating or sealant, the aqueous phase curing agent of the present invention should comprise water or water and a catalyst. The adhesive system is applied to the surface to be coated in the same manner as previously described, however, a second substrate is not bonded to the surface of the first substrate. Instead, the adhesive system is allowed to cure on the surface of the first substrate. The adhesive system of the present invention is particularly suited to producing a moisture resistant coating on the surface of recreational foams.

Having described the invention above, various modifications of the techniques, procedures, material and equipment will be apparent to those in the art. It is intended that all such variations within the scope and spirit of the appended claims be embraced thereby.

What is claimed is:

1. A two part polyurethane adhesive system, comprising:
   a polyurethane prepolymer comprising a reaction mixture of a polyol and an excess of an isocyanate having at least two NCO groups, wherein the polyol comprises propylene oxide and ethylene oxide randomly copolymerized with an initiator to a number average molecular weight of between about 1000 and about 5000 per terminal hydroxyl group of the polyol and wherein about 50 to about 90 percent by weight of the polyol is polymerized ethylene oxide; and
   an aqueous phase curing agent for initiating a reaction with the polyurethane prepolymer.

2. The adhesive system of claim 1 wherein about 65 to about 75 percent by weight of the polyol is polymerized ethylene oxide.

3. The adhesive system of claim 1 wherein the polyol comprises propylene oxide and ethylene oxide randomly copolymerized with an initiator to a number average molecular weight of between about 1500 and about 2000 per terminal hydroxyl group of the polyol.

4. The adhesive system of claim 1 wherein the reaction mixture has between about 5 and about 15 percent by weight excess free isocyanate.

5. The adhesive system of claim 1 wherein the prepolymer produced by the reaction mixture has a viscosity of between about 2,000 and about 25,000 centipose at 25° C.

6. The adhesive system of claim 1 wherein the aqueous phase curing agent comprises water and a catalyst.

7. The adhesive system of claim 1 wherein the isocyanate comprises polymeric MDI.

8. The adhesive system of claim 1 wherein the isocyanate comprises diphenylmethane diisocyanate single isomer or mixtures of isomers.

9. The adhesive system of claim 1 wherein the isocyanate comprises toluene diisocyanate single isomer or mixtures of isomers.

10. The adhesive system of claim 1 wherein the polyurethane prepolymer further comprises a flame retardant.

11. The adhesive system of claim 1 wherein the polyurethane prepolymer further comprises a non-volatile organic solvent.

12. The adhesive system of claim 1 wherein the polyurethane prepolymer further comprises a plasticizer.

13. The adhesive system of claim 1 wherein between about 30 and about 60 percent by weight of the polyurethane prepolymer comprises flame retardant, plasticizer, and/or non-volatile organic solvent.

14. A two part polyurethane adhesive system, comprising:
   a polyurethane prepolymer comprising a reaction mixture of a polyol and polymeric MDI containing between about 5 to about 15 percent excess free NCO by weight, wherein the polyol comprises propylene oxide and ethylene oxide randomly copolymerized with an initiator to a molecular weight of between about 1500 and about 2000 per terminal hydroxyl group of the polyol, wherein about 50 to about 90 percent by weight of the polyol is polymerized ethylene oxide, and wherein the reaction mixture has a viscosity of between about 2,000 and about 25,000 centipoise at 25° C.; and an aqueous phase curing agent for initiating a reaction with the polyurethane prepolymer.

15. The adhesive system of claim 14 wherein the aqueous phase curing agent comprises water and a catalyst.

16. The adhesive system of claim 14 wherein the reaction mixture is diluted to a viscosity of between about 1000 and 1500 centipose at 25° C.

17. A two part polyurethane adhesive system, comprising:

a polyurethane prepolymer comprising a reaction mixture of a polyol and an excess of an isocyanate having at least two NCO groups, wherein the polyol comprises propylene oxide and ethylene oxide randomly copolymerized with an initiator to a number average molecular weight of between about 1000 and about 5000 per terminal hydroxyl group of the polyol and wherein about 50 to about 90 percent by weight of the polyol is polymerized ethylene oxide; and an aqueous phase curing agent for initiating a reaction with the polyurethane prepolymer, the aqueous phase curing agent comprising water and a tackifying agent.

18. The adhesive system of claim 17 wherein the tackifying agent is selected from the group consisting of polyvinyl alcohol, SBR latex, and natural latex.

19. The adhesive system of claim 17 wherein the tackifying agent comprises water and latex.

20. The adhesive system of claim 17 wherein the aqueous phase curing agent further comprises a catalyst.

21. The adhesive system of claim 20 wherein the catalyst is an amine catalyst present at between about 2 and about 20 percent by weight of the total aqueous phase curing agent.

22. The adhesive system of claim 17 wherein the polyol comprises propylene oxide and ethylene oxide randomly copolymerized with an initiator to a molecular weight of between about 1500 and about 2000 per terminal hydroxyl group of the polyol.

23. The adhesive system of claim 17 wherein about 65 to about 75 percent by weight of the polyol is polymerized ethylene oxide.

24. The adhesive system of claim 17 wherein between about 30 and about 60 percent by weight of the polyurethane prepolymer comprises flame retardant, plasticizer, and/or non-volatile organic solvent.

25. The adhesive system of claim 17 wherein the weight ratio of prepolymer to aqueous phase curing agent is about 1.0 to 1.0.

26. A two part polyurethane adhesive system, comprising:

a polyurethane prepolymer comprising a reaction mixture of a polyol and polymeric MDI containing between about 5 to about 15 percent excess free NCO by weight, wherein the polyol comprises propylene oxide and ethylene oxide randomly copolymerized with an initiator to a molecular weight of between about 1500 and about 2000 per terminal hydroxyl group of the polyol, wherein about 50 to about 90 percent by weight of the polyol is polymerized ethylene oxide, and wherein the reaction mixture has a viscosity of between about 2,000 and about 25,000 centipoise at 25° C.; and an aqueous phase curing agent for initiating a reaction with the polyurethane prepolymer, the aqueous phase curing agent comprising water and a tackifying agent.

27. The adhesive system of claim 26 wherein the tackifying agent is selected from the group consisting of polyvinyl alcohol, SBR latex, and natural latex.

28. The adhesive system of claim 26 wherein the tackifying agent comprises water and latex.

29. The adhesive system of claim 26 wherein the aqueous phase curing agent further comprises a catalyst.

30. The adhesive system of claim 29 wherein the catalyst is an amine catalyst present at between about 2 and about 20 percent by weight of the total aqueous phase curing agent.

31. The adhesive system of claim 26 wherein about 65 to about 75 percent by weight of the polyol is polymerized ethylene oxide.

32. The adhesive system of claim 26 wherein between about 30 and about 60 percent by weight of the polyurethane prepolymer comprises flame retardant, plasticizer, and/or non-volatile organic solvent.

33. The adhesive system of claim 26 wherein the weight ratio of prepolymer to aqueous phase curing agent is about 1.0 to 1.0.

34. The adhesive system of claim 17 wherein the tackifying agent is selected from the group consisting of polyvinyl alcohol, SBR latex, natural latex, vinyl acetate, acrylic, vinyl acetate and acrylic emulsions, vinyl acrylic, styrene acrylic, and vinyl ester.

35. The adhesive system of claim 26 wherein the tackifying agent is selected from the group consisting of polyvinyl alcohol, SBR latex, natural latex, vinyl acetate, acrylic, vinyl acetate and acrylic emulsions, vinyl acrylic, styrene acrylic, and vinyl ester.

* * * * *